United States Patent
Gottschling et al.

(10) Patent No.: US 6,464,427 B1
(45) Date of Patent: Oct. 15, 2002

(54) ROAD ROLLER COMPRISING AT LEAST ONE ROLLER-WHEEL UNIT

(75) Inventors: Hans Gottschling, Dusseldorf; Holger Vetterlein, Ditfurt, both of (DE)

(73) Assignee: Vibromax Bodenverdichtungsmaschinen GmbH, Gatersleben (DE)

( * ) Notice: Subject to any disclaimer, the term of this patent is extended or adjusted under 35 U.S.C. 154(b) by 0 days.

(21) Appl. No.: 09/647,231

(22) PCT Filed: Mar. 26, 1999

(86) PCT No.: PCT/EP99/02348

§ 371 (c)(1),
(2), (4) Date: Dec. 11, 2000

(87) PCT Pub. No.: WO99/49139

PCT Pub. Date: Sep. 30, 1999

(30) Foreign Application Priority Data

Mar. 26, 1998 (DE) .......................... 198 13 475

(51) Int. Cl.[7] .......................... E01C 19/26; B62D 13/00
(52) U.S. Cl. .................... 404/117; 404/122; 280/400; 280/419; 280/442
(58) Field of Search ................. 404/117, 122, 404/126; 280/400, 419, 442

(56) References Cited

U.S. PATENT DOCUMENTS

| | | | | |
|---|---|---|---|---|
| 3,566,761 A | * | 3/1971 | Domenighetti | 280/444 |
| 3,683,763 A | * | 8/1972 | Keppler et al. | 180/20 |
| 3,806,158 A | * | 4/1974 | Casey | 280/400 |
| 3,868,194 A | * | 2/1975 | Ferguson et al. | 180/20 |
| 3,947,142 A | * | 3/1976 | Takata et al. | 404/126 |
| 4,313,691 A | * | 2/1982 | Yargici | 384/132 |
| 4,737,050 A | * | 4/1988 | Abd. El Halim | 404/117 |
| 5,154,439 A | * | 10/1992 | Weyer | 172/184 |
| 5,366,299 A | * | 11/1994 | Hughes | 280/400 |
| 5,562,175 A | * | 10/1996 | Bjorsne et al. | 180/20 |

\* cited by examiner

Primary Examiner—Gary S. Hartmann
(74) Attorney, Agent, or Firm—Brian B. Shaw, Esq.; Stephen B. Salai, Esq.; Harter, Secrest & Emery LLP

(57) ABSTRACT

The invention relates to a compactor comprising at least one drum unit (14, 15) in which a cylindrical drum (21) is rotationally mounted about its axle (40), the at least one drum unit (14, 15) being rotationally mounted about a steering axis (18) on a chassis frame (45) of the compactor (10) and connected to a middle piece (27, 35) rotationally mounted via two opposing maintenance-free angular-contact articulation joints (28, 34) about the steering axis (18) on two trunnions (31) non-rotatively connected to a mounting fixture (16, 17) on the chassis frame (45).

12 Claims, 4 Drawing Sheets

ROAD ROLLER COMPRISING AT LEAST ONE ROLLER-WHEEL UNIT

BACKGROUND OF THE INVENTION

The invention relates to a road roller or compactor comprising at least one roller wheel unit or drum unit in which a cylindrical drum is rotationally mounted about its axle, the at least one drum unit being rotationally mounted about a steering axis on a chassis frame of the compactor.

Such compactors are known and find application more particularly on road construction sites. For steering, the complete drum unit is turned relative to the chassis frame. For this purpose the drum unit is fitted rotative to the chassis frame via articulation joints requiring maintenance. The assembly is bulky and requires continuous lubrication. The drawbacks are the costs involved as well as the bulky design and maintenance due to the continuous lubrication requirement.

The object of the present invention is thus to provide a compactor comprising a simple, cost-effective and compact articulation joint for the drum unit on the chassis frame.

In accordance with the invention this object is achieved in that the drum unit is connected to a middle piece rotationally mounted via two opposing maintenance-free angular-contact articulation joints about the steering axis on two trunnions non-rotatively connected to a mounting fixture on the chassis frame.

SUMMARY OF THE INVENTION

Making use of maintenance-free articulation joints makes it possible to do away with the need for continuous lubrication as provided hitherto. The articulation joints are supported between the middle piece and the trunnions and have no contact with the mounting fixture on the chassis frame or the drum unit itself, thus enabling the middle piece and the trunnions to be machined with high precision independently of the other components, i.e. complicated means are now no longer needed at the mounting fixture or drum unit. The result is a straightforward and compact configuration.

Furthermore, by making use of angular-contact articulation joints an O arrangement of the joints is made possible to thus enable the supporting spacing of the joints to be elevated to more than the actual spacing. In addition, the joints can be counterbraced to make for added life.

Advantageous further embodiments and aspects of the invention read from the sub-claims.

In one advantageous aspect the angular-contact articulation joints are inserted in joint openings of the middle piece and the trunnions engage inner rings of the angular-contact articulation joints. Of advantage is the simple configuration of this structure, i.e. it merely being necessary to provide the middle piece with the joint openings whilst the trunnions can be produced separately. The expense and volume of the machining required is less than when making use of a middle piece in the form of a trunnion spider.

It is of advantage to support one of the angular-contact articulation joints on the middle piece by a spring element, more particularly by a disk spring. This spring element provides, on the one hand, vibration damping and makes it possible, on the other, to install the opposing angular-contact articulation joints with zero clearance.

Preference is given to disk springs because of the high spring capacity they provide.

In accordance with one further embodiment the mounting fixture comprises a substantially rectangular chassis frame into which the middle piece is insertable, the frame being provided with two opposing openings through which the trunnions engage the angular-contact articulation joints at the middle piece. For assembly the middle piece is simply inserted into the frame. Subsequently the trunnions are inserted at opposing ends through the openings in the frame into the angular contact articulation joints. Implementing assembly is speedy and simple.

To advantage the trunnions comprise a flange for bolting to the frame of the mounting fixture to thus permit speedy and simple attachment of the trunnions. At the same time the opposing angular-contact articulation joints are reliably held in place by the likewise opposing trunnions and can be counterbraced.

In another advantageous aspect the drum unit comprises two struts, on which the drum is mounted for rotation about its axle, as well as two steering brackets for connecting the struts releasably connected thereto and connected to the middle piece. The struts and steering brackets may be configured mirror-inverse to thus simplify the design. The releasable connection between the steering brackets and struts as well as between the steering brackets and middle piece permit simple, uncomplicated assembly.

In a first advantageous embodiment the middle piece is configured substantially cylindrical and rigidly connected to a plate bolted to the steering brackets of the drum unit. This embodiment ensures that the drum unit is rotatable only about the steering axis provided and reliably excludes any other movement. Securing the steering brackets of the drum unit by bolts serves to facilitate assembly.

In a second advantageous embodiment the middle piece is configured substantially cuboidal and comprises two further maintenance-free angular-contact articulation joints with assigned trunnions arranged at right angles to the first angular-contact articulation joints. In this embodiment the trunnions pass through the steering brackets of the drum unit and are non-rotatively secured thereto. This embodiment permits in addition to rotation about the steering axis also a rotation of the drum unit about a swing axis oriented perpendicular to the steering axis. Preferably the oscillation axis is oriented parallel to the steering axis of the compactor.

This embodiment permits, in addition to a steering movement, also oscillation of the drum unit in adapting to ground irregularities and for compensating skew settings.

Advantageously at least one of these further angular-contact articulation joints is supported by a ring for tolerance compensation. This support enables inaccuracies in machining to be offset so that the spacing between the angular-contact articulation joints and the trunnions can be adapted to the spacing between the steering brackets.

When making use of such rings on both angular-contact articulation joints the location of the steering brackets may also be varied relative to the middle piece.

It is, of course, just as possible that the compactor comprises two drum units, it being preferred in this case when the mounting fixtures for the drum units are configured identical to reduce structural complexity.

In this case it is of advantage when the front drum unit is frame mounted via a cylindrical middle piece and the rear drum unit via a cuboidal middle piece so that both drum units are steerable whilst the rear drum unit is simultaneously rotatable about the oscillation axis relative to the front drum unit to thus achieve a compensation between the front and rear drum unit to avoid prohibitively high forces being introduced into the chassis frame of the compactor. This compensation is particularly important when the front and rear drums roll over planes inclined to each other.

A BRIEF DESCRIPTION OF THE DRAWING

The invention will now be detained by way of example embodiments illustrated schematically in the drawing in which.

A DETAILED DESCRIPTION

Figure 1:
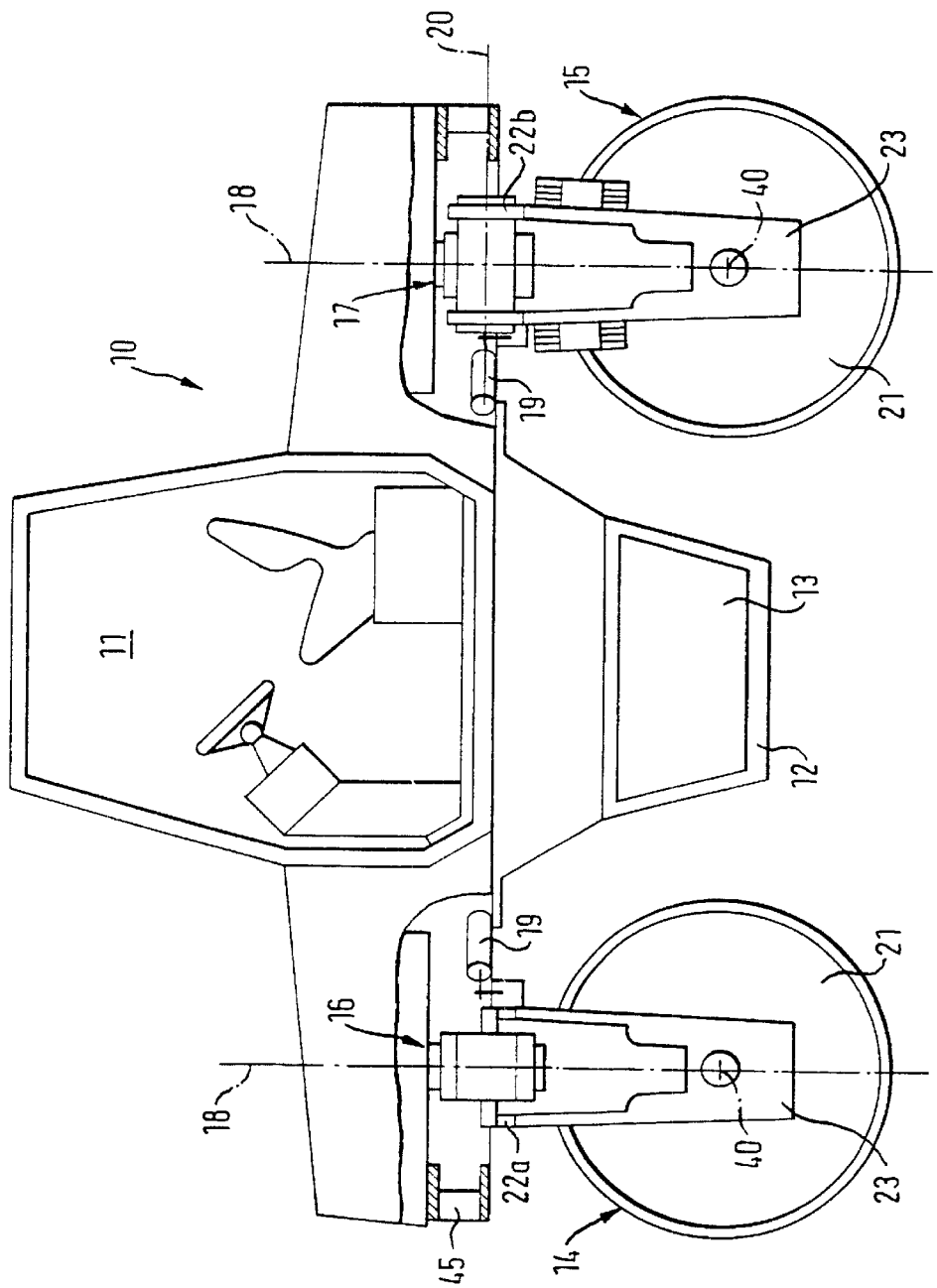
FIG. 1 is a side view of a compactor in accordance with the invention.

Referring now to FIG. 1 there is illustrated a tandem compactor 10 including a cab 11, an engine gondola 12 housing an engine 13, as well as a front drum unit 14 and rear drum unit 15. The front drum unit 14 is secured to a mounting fixture 16 and the rear drum unit 15 to a mounting fixture 17. The mounting fixtures 16, 17 are rigidly defined at a chassis frame 45 of the tandem compactor 10.

The drum units 14, 15 are rotatable about a steering axis 18 in the mounting fixtures 16, 17, a cylinder 19 secured to each drum unit 14, 15 as well as to the chassis frame 45 serving in each case to introduce the rotary movement.

The front drum unit 14 comprises two steering brackets 22a connected to struts 23. Rotationally mounted about its axle 40 between the struts 23 is a drum 21. The rear drum unit 15 comprises steering brackets 22b connected to substantially the same configured struts 23, here too the drum 21 being rotatable about its axle 40.

The front drum unit 14 is rotatable only about the steering axis 18 whilst the rear drum unit 15 is rotatable about both the steering axis 18 and the oscillation axis 20. The oscillation axis 20 runs substantially parallel to the longitudinal centerline of the tandem compactor 10.

Figure 2:
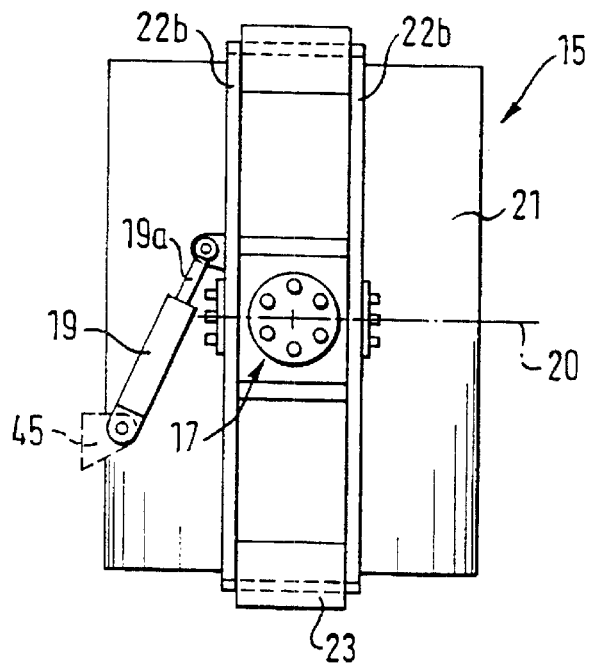
FIG. 2 is a view from above of the rear drum unit together with the corresponding mounting fixture.
Figure 3:
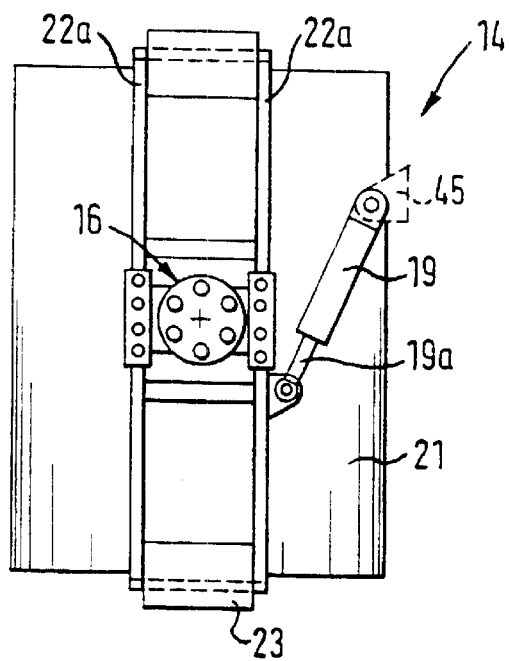
FIG. 3 is a view from above of the front drum unit together with the corresponding mounting fixture.

Referring now to FIGS. 2 and 3 there is illustrated in each case a view from above of the rear drum unit 15 and front drum unit 14 respectively. The cylinder 19 is secured by one end to the chassis frame 45 whilst its piston rod 19a engages the steering brackets 22a and 22b respectively. The cylinder 19 is arranged roughly level with the oscillation axis 20 in the case of the rear drum unit 15 to minimize interaction between movement of the rear drum unit 15 about the oscillation axis 20 and movement of the cylinder 19.

Figure 4:
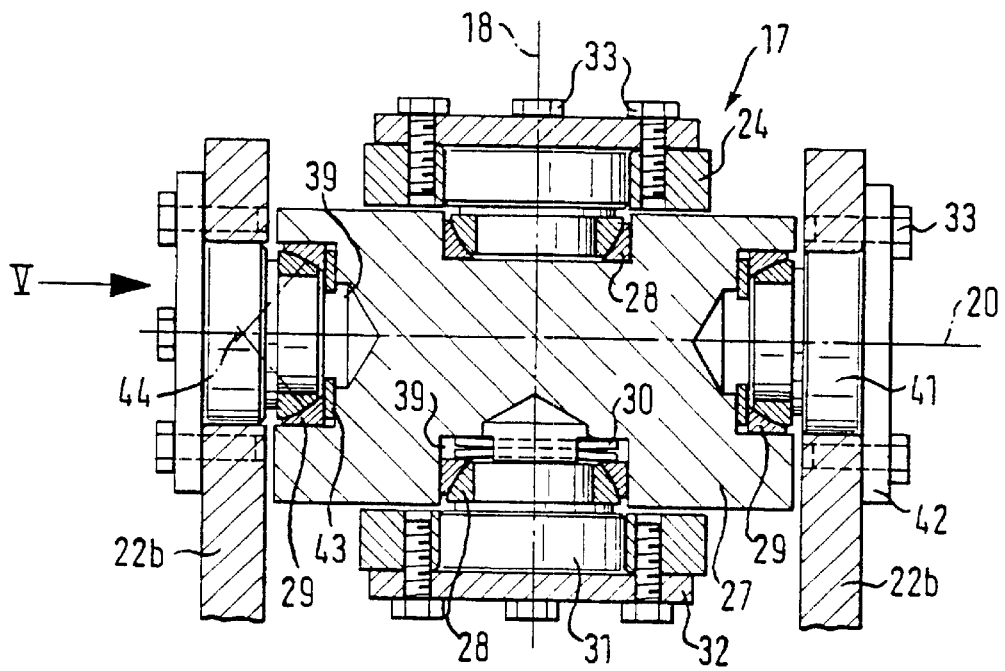
FIG. 4 is a vertical section through the rear mounting fixture with the steering brackets fitted.
Figure 5:
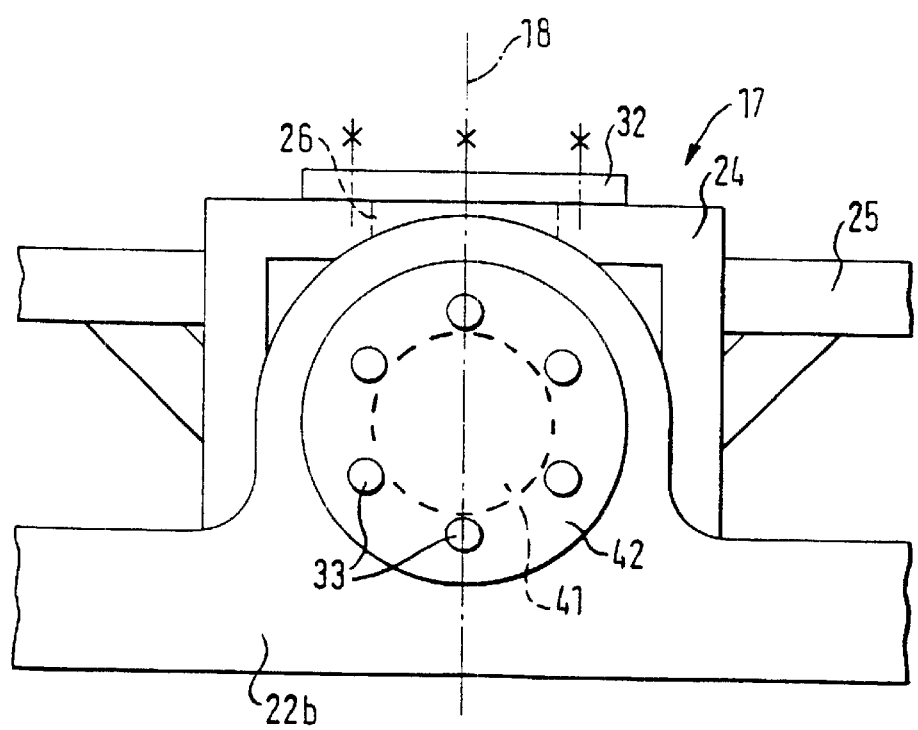
FIG. 5 is a view in the direction of the arrow V as shown in FIG. 4.

Referring now to FIGS. 4 and 5 there is illustrated in more detail the rear mounting fixture 17 together with how the rear drum unit 15 is mounted. The mounting fixture 17 consists substantially of a rectangular frame 24 secured via plates 25 to the chassis frame 45 of the tandem compactor 10. For stiffening, triangular gussets may be welded thereto.

Inserted into the interior of the frame 24 is a middle piece 27 configured roughly cuboidal and provided with four angular-contact articulation joints 28, 29 located in corresponding joint openings 39 in the middle piece 27. In this arrangement the angular-contact articulation joints 28, 29 are arranged opposite each other in pairs. The first pair of the angular-contact articulation joints 28 permits a rotation about the steering axis 18 whilst the second pair of angular-contact articulation joints 29 enables rotation about the oscillation axis 20.

The angular-contact articulation joints 28 are secured via trunnions 31 to the frame 24 of the mounting fixture 17. In this arrangement the trunnions 31 pass through the openings 26 in the frame 24 and extend up to the inner ring of the angular-contact articulation joints 28. Securing them to the frame 24 is done via a flange 32 of the trunnions 31 and corresponding bolts 33.

One of the angular-contact articulation joints 28 is supported via a disk spring 30 at the middle piece 27. The corresponding joint opening 39 is configured correspondingly somewhat larger. This spring support results in damping of the vibrations introduced via the steering brackets 22b passed on, but not to the full extent, to the chassis frame 45 of the tandem compactor whilst achieving compensation of the tolerances and pretensioning the angular-contact articulation joints 28.

The further angular-contact articulation joints 29 permitting rotation about the oscillation axis 20 are secured by trunnions 41 to the steering brackets 22b of the drum unit 15. The trunnions 41 pass through a opening in the steering brackets 22b and engage the inner ring of the angular-contact articulation joints 29, they being secured via a flange 42 of the trunnions 41 which is bolted to the steering brackets 22b by means of bolts 33.

It is evident how both angular-contact articulation joints 29 are supported at the middle piece 27 by the rings 43 permitting compensation of tolerances whilst enabling the location of the steering brackets 22b relative to the steering axis 18 to be laterally adjusted to a certain extent.

Rotational movement of the drum unit 15 about the steering axis 18 is achieved correspondingly by the rotatively mounted middle piece 27 via the angular-contact articulation joints 28. In addition the drum unit 15 is rotatable by the oscillation axis 20 relative to the middle piece 27 via the further angular-contact articulation joints 29.

For assembly, first the middle piece 27 is introduced into the frame 24 of the mounting fixture 17, the trunnions 31 with the angular-contact articulation joints 28 being subsequently introduced through the openings 26 together with the disk spring 30 and secured by bolts 33. The disk spring 30 results in a compensation of tolerances and spring mounting.

After this, the drum unit 15 is brought into place. The trunnions 41 are inserted together with the angular-contact articulation joints 29 and secured by means of the bolts 33. The rings 43 for compensation of tolerances and finalizing location of the drum unit 15 are incorporated either together with the angular-contact articulation joints 29 or prior to fitting the drum unit 15 in the joint openings 39.

It is, of course, just as possible to preassemble the angular-contact articulation joints 28, 29, disk spring 30 as well as the rings 43 at the middle piece 27 with no change in the sequence of assembly.

Figure 6:
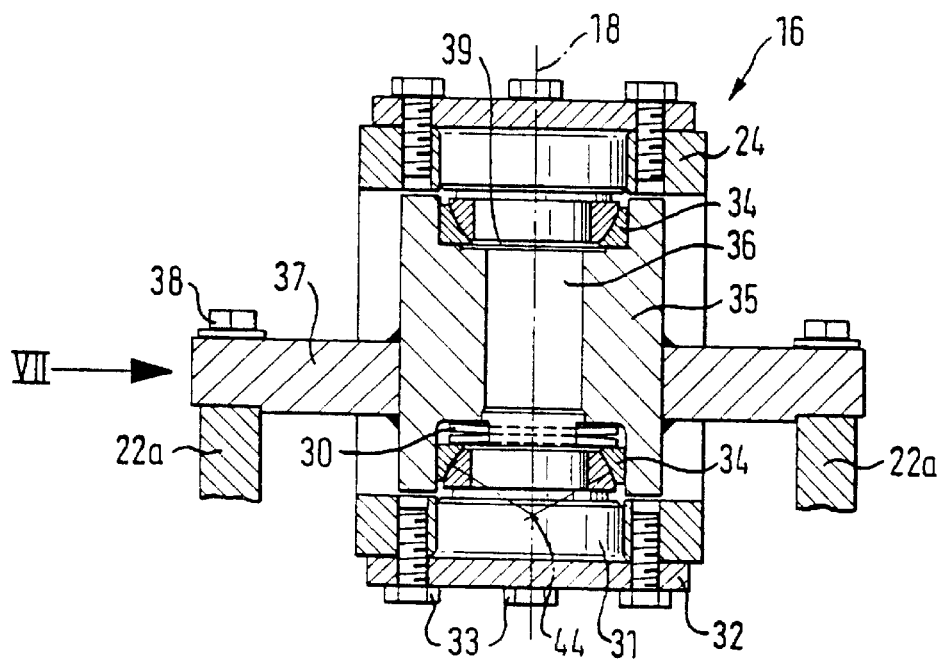
FIG. 6 is a section similar to that as shown in FIG. 4 through the front mounting fixture.
Figure 7:
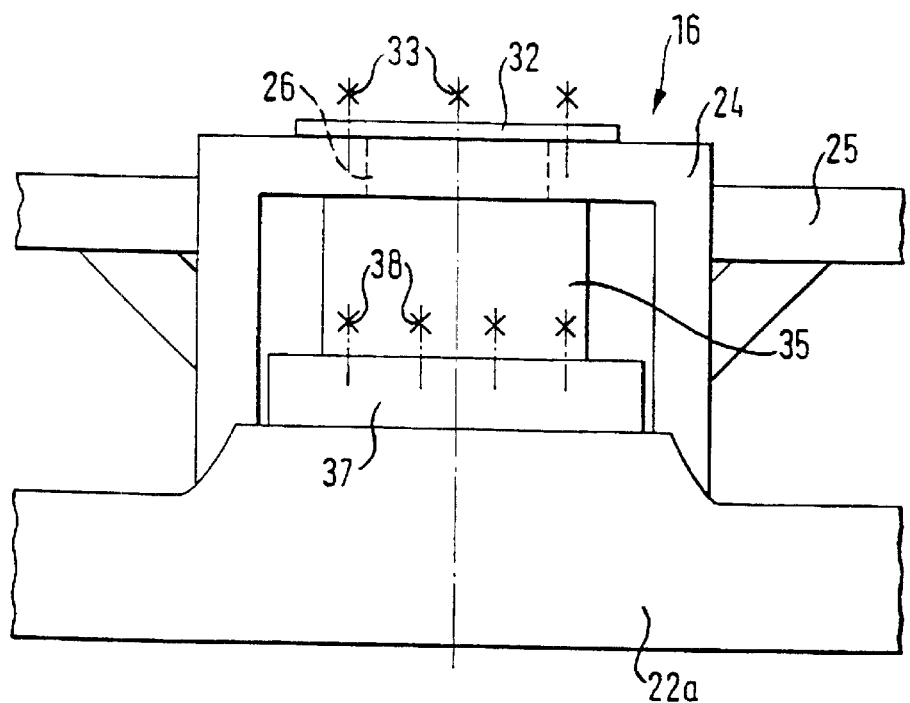
FIG. 7 is a view in the direction of the arrow VII as shown in FIG. 6.

Referring now to FIGS. 6 and 7 there is illustrated how the front drum unit 14 is mounted in making use of a cylindrical middle piece 35 having a middle opening 36, the middle piece 35 being preferably a heavy gauge tube.

Mounting is achieved via two opposing angular-contact articulation joints 34, one of which is supported by a disk spring 30. For securing, trunnions 31 are provided in turn. It is to be noted that mounting fixture 16 is identical in design to the mounting fixture 17, fitting and functioning of the angular-contact articulation joints 34 as well as the trunnions 31 being likewise the same as for the mounting fixture 17. To avoid tedious repetition reference is thus made to the description as given above.

The middle piece 35 is rigidly connected to a plate 37 totally clasping the middle piece 35 and bolted by bolts 33 to the steering brackets 22a of the front drum unit 14 which is thus rotatable only about the steering axis 18 in the mounting fixture 16.

For assembly, the middle piece 35 is inserted into the frame 24 and secured via the angular-contact articulation joints 34 and the trunnions 31. Fitting the angular-contact articulation joints 34 and trunnions 31 is done the same as for fitting the angular-contact articulation joints 28 and trunnions 31 of the mounting fixture 17.

Subsequently, the front drum unit 14 is located from underneath and bolted with its steering brackets 22a to the plate 37 by the bolts 38.

Employing angular-contact articulation joints 28, 29, 34 permits increasing the supporting joint spacing beyond the actual joint spacing, this joint arrangement also being termed an O arrangement in which, as evident from FIGS. 4 and 6, the active center 44 of the angularcontact articulation joints 29, 34 is outside of the middle piece 27. It is due to this increase in the actually effective joint spacing that higher loads can be handled for no increase in size. In addition the angular-contact articulation joints 28, 29, 34 may be counterbraced in pairs. Pretensioning is achieved by the disk spring 30 or the rings 43 and permits a rugged mount with zero clearance.

In all, a simple, cost-effective and compact jointing arrangement of the drum units 14, 15 to the chassis frame 35 of the tandem compactor is achieved which is speedy and straightforward to install whilst permitting rotation of the drum units 14, 15 about the steering axis 18 as well as angular compensation of the drum units 14, 15 relative to each other.

What is claimed is:

1. A compactor comprising: at least one drum unit in which a cylindrical drum is rotationally mounted about an axle, the at least one drum unit being rotationally mounted about a steering axis on a chassis frame of the compactor and connected to a middle piece rotationally mounted via two opposing maintenance-free angular-contact articulation joints about said steering axis, characterized in that two trunnions non-rotatively connected to a mounting fixture on said chassis frame engage said middle piece, and wherein said angular-contact articulation joints are accommodated between said middle piece and said trunnions.

2. The compactor as set forth in claim 1, in which said angular-contact articulation joints are inserted in joint openings of said middle piece and said trunnions engage inner rings of said angular-contact articulation joints.

3. The compactor as set forth in claim 1 in which one of said angular-contact articulation joints is supported on said middle piece by a disk spring.

4. The compactor as set forth in claim 1 in which said mounting fixture comprises a substantially rectangular frame into which said middle piece is inserted, said frame being provided with two opposing openings through which said trunnions engage said angular-contact articulation joints at said middle piece.

5. The compactor as set forth in claim 4, in which said trunnions comprise a flange for bolting by bolts to said frame of said mounting fixture.

6. The compactor as set forth in claim 1 in which said drum unit comprises two struts on which said drum is mounted for rotation about its axle, as well as two steering brackets for connecting said struts releasably connected thereto and connected to said middle piece.

7. The compactor as set forth in claim 1 in which said middle piece is configured substantially cylindrical and rigidly connected to a plate bolted by bolts to said steering brackets of said drum unit.

8. The compactor as set forth in claim 1 in which said middle piece is configured substantially cuboidal and comprises two further maintenance-free angular-contact articulation joints with assigned trunnions arranged at right angles to said first angular-contact articulation joints and permits rotation of said drum unit about an oscillation axis, said trunnions passing through said steering brackets of said drum unit and being non-rotatively secured thereto.

9. The compactor as set forth in claim 8, in which at least one of said angular-contact articulation joints is supported by a ring at said middle piece for tolerance compensation.

10. The compactor as set forth in claim 1 in which two drum units are provided with corresponding mounting fixtures.

11. The compactor as set forth in claim 10, in which said mounting fixtures are configured identical.

12. The compactor as set forth in claim 10 in which said front drum unit is mounted via a cylindrical middle piece rotatable about said steering axis and said rear drum unit is mounted via a cuboidal middle piece rotatable about said steering axis as well as about said oscillation axis on said chassis frame of said compactor.

* * * * *

UNITED STATES PATENT AND TRADEMARK OFFICE
CERTIFICATE OF CORRECTION

| | | |
|---|---|---|
| PATENT NO. | : 6,464,427 B1 | Page 1 of 1 |
| DATED | : October 15, 2002 | |
| INVENTOR(S) | : Gottschling, Hans and Holger Vetterlein | |

It is certified that error appears in the above-identified patent and that said Letters Patent is hereby corrected as shown below:

<u>Title page,</u>
Item [22], PCT filed, the date reading "Mar. 26, 1999", should read -- Mar. 19, 1999 --.

Signed and Sealed this

Eighth Day of April, 2003

JAMES E. ROGAN
*Director of the United States Patent and Trademark Office*